United States Patent
Schaeffeler et al.

(10) Patent No.: US 6,949,290 B2
(45) Date of Patent: Sep. 27, 2005

(54) PRODUCING A TEXTURED EFFECT IN A PLASTIC FILM, AND PLASTIC FILMS HAVING A RELIEF PATTERN MADE BY THIS METHOD

(75) Inventors: Lothar Schaeffeler, Bonn (DE); Wolfgang Mauer, Siegburg (DE)

(73) Assignee: Siegwerk Druckfarben GmbH & Co. KG, Siegburg (DE)

( * ) Notice: Subject to any disclaimer, the term of this patent is extended or adjusted under 35 U.S.C. 154(b) by 52 days.

(21) Appl. No.: 10/380,603

(22) Filed: Mar. 14, 2003

(65) Prior Publication Data

US 2005/0106393 A1 May 19, 2005
US 2005/0202247 A9 May 19, 2005

Related U.S. Application Data

(63) Continuation of application No. PCT/EP02/07669, filed on Jul. 10, 2002.

(30) Foreign Application Priority Data

Jul. 14, 2001 (DE) .......................................... 101 34 392

(51) Int. Cl.[7] .............................. B32B 9/04; B05D 3/00; B05D 7/04; B05D 7/26
(52) U.S. Cl. .................... 428/411.1; 427/280; 427/307; 427/384; 427/536; 427/553; 427/557
(58) Field of Search ................................ 427/256, 257, 427/258, 262, 267, 271, 274, 280, 307, 322, 372.2, 384, 508, 510, 514, 521, 533, 534, 535, 536, 553, 557, 558, 569, 580; 428/411.1

(56) References Cited

FOREIGN PATENT DOCUMENTS

| DE | 37 19 957 A1 | * | 12/1987 |
| DE | 690 12 344 T2 | | 6/1991 |
| GB | 2 193 147 A | * | 2/1988 |
| JP | 52 148557 | | 12/1977 |
| JP | 07 329083 | | 12/1995 |

OTHER PUBLICATIONS

Otto Althaus: Packaging Using Plastics, Hanser–Verlag, Vienna, pp. 219–220.

Rompp Chemical Dictionary, 9th Edition, pp. 2403–2404.

* cited by examiner

*Primary Examiner*—Timothy Meeks
*Assistant Examiner*—William Phillip Fletcher, III
(74) *Attorney, Agent, or Firm*—Milde & Hoffberg, LLP

(57) ABSTRACT

A method of manufacturing an imprinted effect in a plastic film, characterized by the following steps: (a) applying a hardenable mixture of lacquer and solvent subject to volumetric shrinkage in liquid form to a localized area of the plastic film, whereby the plastic film surface is for all practical purposes made insoluble by the solvent; (b) drying the lacquer-solvent material; (c) hardening the lacquer to a lacquer-laminate layer that is completely bound to a localized area of the surface; and (d) allowing the lacquer-laminate layer to shrink, with a simultaneous tightening of the laminated plastic film below the lacquer-laminate layer without formation of wrinkles.

13 Claims, 1 Drawing Sheet

PRODUCING A TEXTURED EFFECT IN A PLASTIC FILM, AND PLASTIC FILMS HAVING A RELIEF PATTERN MADE BY THIS METHOD

CROSS REFERENCE TO RELATED APPLICATION

This application is a continuation of International Application No. PCT/EP02/07669 filed Jul. 10, 2002.

BACKGROUND OF THE INVENTION

The invention relates to a procedure to manufacture a textured effect in a plastic film, and to plastic films having a relief pattern made by this procedure.

Various procedures are known to manufacture textured effects in plastic films (see the book by Otto ALTHAUS: *Packaging Using Plastics*, Hanser-Verlag, Vienna, 1997, pp. 219–220).

The best known and most used procedure is one in which the plastic film, preferably a thermoplastic, is passed through a pair of rollers provided with a female and a male molding surface, so that the calendered film is embossed with an imprinted texture.

A method to impress plastic film using flat heat stamps is also known. Additionally, contact-free procedures such as irradiation, heat treatment, or air pressure that create imprinted textures are known.

Chemical impression procedures also exist. For example, a film of cellulose ester may be treated at individual points using an alkali salt so that ornamental effects result in the areas treated. With this procedure, however, the treatment solution must be very thoroughly rinsed since it would lead to undesirable spot formation if it were to remain on the plastic in untreated areas.

A procedure is also known from the German Patent No. DE 690 12 344 T2 that creates a material possessing an interference pattern, e.g., a hologram, whereby one side of a base film is coated with a solvent that surrounds a transparent, heat-deformable lacquer. The lacquer is dried so that a solid lacquer layer is formed. The interference pattern is formed by impressing the interference pattern onto the side of the solid lacquer layer facing away from the base film. The base film is subsequently separated from the lacquer layer.

Another known procedure comes from JP 52-148557 in which expanding pressure paint is used that leads to a relief-type structure on a substrate after printing and expansion.

The Japanese Patent No. JP 73 29083-A describes a procedure in which a curling or crinkling effect results from partial adhesion of a material with a thinned substrate whereby a curling results at the non-adhering points after contraction. A disadvantage here is that an inconvenient procedure is involved, and that adhesive remainders may remain on the materials.

Reference is also made to a procedure to form patterns (German Patent No. DE 37 19 957 A1) in which an irradiation-absorbing material is placed into an environment of synthetic fibers and polymers of high molecular weight, whereby the material is heated by means of irradiation with infrared light, and the surrounding polymer is softened, shrunk, melted, or broken. It is possible by means of this alteration to create a crinkled or relief pattern. This known procedure for application to woven fabrics, coarse-woven material, plush (moquette), and knitted fabrics is particularly suitable. An embodiment for films is not described. A disadvantage to this type of manufacture of ornamental effects is that an optical alteration must be undertaken by means of high light-absorbing agents, soot or graphite being specifically specified, by means of which heat may be applied locally. Even if, as recommended, rinsing is performed after the irradiation treatment, undesirable color alteration cannot always be avoided.

SUMMARY OF THE INVENTION

Within the scope of manufacturing technology for imprinted textures on plastic films, the objective of the invention is to provide a procedure to manufacture an imprinted texture in a single step, preferably during a pressure process, without the use of special textured pressure rollers, male molds, or expanding printing ink.

This objective is achieved by a method that includes the following method steps:
a) applying a hardenable mixture of lacquer and solvent subject to volumetric shrinkage in liquid form to a localized area on the plastic film that is to receive the impression effect, whereby the plastic film surface which preferably has previously been subjected to a surface treatment that increases the wettability and paint bonding ability is for all practical purposes made insoluble by the solvent;
b) drying the lacquer-solvent material; and
c) allowing the lacquer to harden and shrink to a lacquer-laminate layer completely bound to a localized area of the surface, with a simultaneous tightening of the laminated plastic film below the lacquer-laminate layer without formation of wrinkles.

An essential step in the above-noted method is allowing the lacquer-laminate layer to contract without the plastic film located in the area of the lacquer-laminate layer and below it becoming corrugated. This is achieved in that a physically-strong adhesive bond is achieved between the lacquer-laminate layer and the surface of the plastic film. This bond may be ionomeric, for example, or may be achieved by combining groups with opposing polarity. In most cases, it is usually desirable to perform surface treatment on the plastic film to be provided with the imprinted effect before application of the lacquer in an attempt to increase its wettability and paint bonding ability. The same procedure is generally used that is also used for the preparation of plastic film before imprinting, such as etching, electrical corona procedure, plasma procedure, or flaming. For surface treatment, chemical procedures, coatings with primer solutions or acrylate lacquer, are known.

The imprinted effect distinguishes itself also with brittle and hard plastic films if they are thin enough, i.e., with a thickness of about 10 to 20 $\mu$m. Preferably plastic films that are soft and elastic are used. Such films may possess greater thickness, i.e., about 20 to 100 $\mu$m.

Low-cost plastic films of a polyolefin (polypropylene, polyethylene, or mixed co-polymers), a polyamide, a polyester such as Teflon, a thermoplastic elastomer, a polyvinyl chloride mixed with softener or of a soft, elastic mixture or co-polymer as are known to plastics experts, and particularly in the packaging industry are used for "impression" of the procedure provided here.

The films used for the procedure may also be metallized by means of a plastic film metallization process (see corresponding key word in RÖMPP Chemical Dictionary, $9^{th}$ edition), whereby either the metallized or non-metallized side may receive treatment with the lacquer-laminate layer mixture.

An additional significant characteristic of the lacquer used is that the solvent used, does not for all practical purposes dissolve the plastic film. Alcohols such as methanol, ethanol, or propanol are suitable, for example, as are water or esters, or mixtures thereof.

During selection of the hardening substance of the lacquer, previous research has found that naturally-occurring and synthetic resins that harden transparent are suitable for mixing with the hardening lacquer substance remaining on the plastic film at a 20% by-weight ratio. Shellac, colophonium derivatives, polyacrylkates, cellulose derivatives, as well as mixtures and modifications thereof that are hard and brittle at 25° C. and harden by volumetric shrinkage, are suitable for this.

Along with a resin, 2 to 10% by volume of nitrocellulose may also be mixed with the lacquer solution mixture.

Other lacquer compositions are possible. Depending on whether the lacquer substance binds internally with the surface so that a shrinkage process occurs, so that the lacquer cannot be easily separated from the plastic surface.

In addition to waiting for the lacquer to harden so the imprinted texture may be formed, the lacquer may be so formulated that it is caused to shrink in the course of hardening by physically-induced moistening and shrinking, in particular by means of UV irradiation and/or heating.

Preferably a completely colorless, transparent lacquer is used. But it is not out of the question for the lacquer to be colored by means of a dye dissolved or dispersed in the solvent.

If the plastic film is to have a concave relief ("bas relief") an impression is taken of the lacquer solvent or if the plastic film is to have a convex, embossed relief, a counter-print is created.

It is further essential that the application of the lacquer-solvent mixture be possible using standard and known printing procedures such as intaglio printing, flexographic printing, offset printing, or similar. So-called digital procedures in which liquid inks are used may also be used. The Ink-Jet process is particularly suited.

The invention also relates to a textured plastic film manufactured using the method. As mentioned above, a concave and convex relief may be created.

The depth of the texture may be varied by controlling the concentration and/or type of the lacquer solvent used. The size is not limited within conventional printing procedures. A limitation does however exist, in that a certain amount of the surrounding area must be present in order for the relief to be raised with respect to the surroundings.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
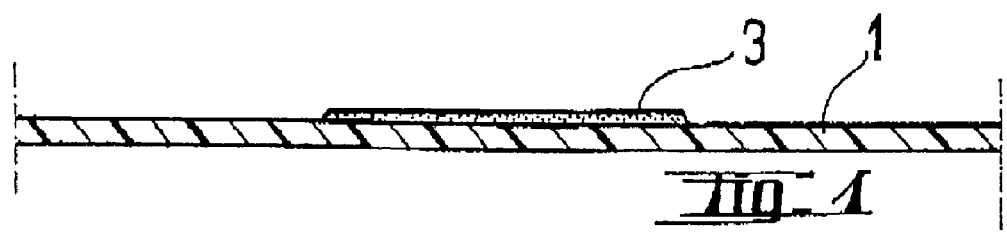
FIG. 1 is a side view, in enlarged perspective, a plastic film onto which the lacquer-solvent mixture is applied.

The preferred embodiments of the present invention will now be described with reference to FIGS. 1–3 of the drawings. Identical elements in the various figures are designated with the same reference numerals.

EXAMPLE 1

Figure 2:
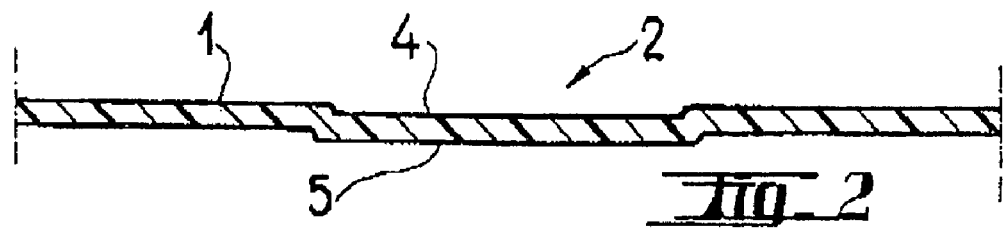
FIG. 2 is a side view of the plastic film as in FIG. 1 after the lacquer has hardened.
Figure 3:
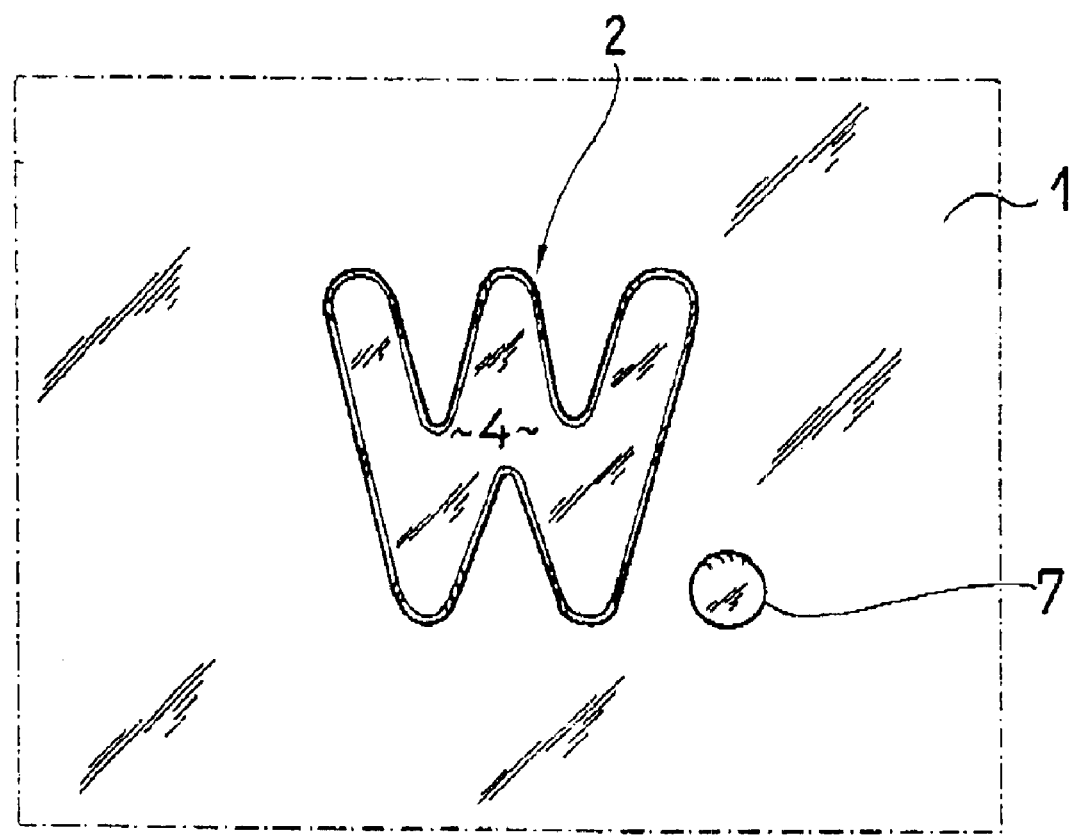
FIG. 3 is a top view of a plastic film with imprinted effects in a reduced perspective with respect to FIG. 1.

(see FIGS. 1–3)

To manufacture a plastic film with an imprinted effect as is usually used in packaging material, a polyethylene film 1 is used. The film has an approximate thickness of 80 $\mu$m.

For flexodruck printing, a lacquer-solvent mixture 3 is applied to the plastic film 1 (see FIG. 1), so that a localized area of the plastic film that is to have the imprinted effect is located underneath the mixture. Before printing, the plastic film is to be prepared so it can receive the lacquer-solvent mixture by use of the corona effect.

The lacquer-solvent mixture is an alcohol solution with ethanol as the solution medium. 25 g maleic resin and 10 g nitrocellulose are dissolved in 100 ml ethanol.

The mixture is applied to the above-mentioned polyethylene film. After the solution medium dries, a thin film results that contracts upon drying and results in a lacquer-laminate layer that deforms the plastic film lying beneath it, with no wrinkling occurring and an imprinted effect results.

FIG. 3 shows the configuration. An imprinted texture configuration in a localized area 2 recessed about 10 $\mu$m with respect to the other plastic surface results, so that the recess is recognizable as a concave shape (bas relief). A lacquer-laminate layer 4 is formed in this area whereby the plastic film area 5 beneath it is slightly constricted. A convex shape of lesser height forms on the lower side.

In reverse, a heightening with respect to the other surface may also be achieved in that a lacquer-solvent mixture is applied to the rear side of the plastic film 1 by means of a counter print so that an embossed point (designated with 7) results.

In other examples, other lacquer-solvent mixtures by means of which the same effect may be achieved may be used in principle.

It must be pointed out that this is essentially a physical effect and that transpositions of lacquer solvent and of plastic films to be provided with imprinted effects comprise additional embodiment examples.

It is also possible to achieve various color effects by means of mixing dyes and effect pigments such as pearl pigments that are added to the plastic film and/or the lacquer-solvent mixture.

Raising and lowering may be varied by varying the amount of the lacquer-solvent mixture applied. The coating weight of the fixed lacquer layer may vary in general between 0.5 and 2 g/m$^2$.

Consider the following additional examples:

EXAMPLE 2

The metallized side of polyethylene terphthalate (PET) film 12 $\mu$m thick is imprinted using flexodruck printing with no pretreatment. The lacquer-laminate mixture consists of ethanol, in which 25% by weight maleic resin and 6.5% by weight nitrocellulose are dissolved. After the volatile components have evaporated, a recess in the imprinted surface, and thus an imprinted effect, is formed.

EXAMPLE 3

A plastic packaging film consisting of a low-density polyethylene (LDPE) 80 $\mu$m thick is imprinted full-surface using intaglio with pressure ink based on a gold bronze dispersed in nitrocellulose. After this print dries, a lacquer-laminate mixture is applied using counter-print. The lacquer-laminate mixture consists of a propanol-ethanol mixture of equal parts as a solution medium and 25% by weight of fumaric resin and about 5% by weight of nitrocellulose. After the volatile components have evaporated and the lacquer has hardened, a lacquer layer about 1 μm of the imprinted (golden) side remains as an embossed surface.

EXAMPLE 4

A plastic film about 12 μm thick, consisting of a polyamide that is conventionally used for packaging film, is corona-treated to increase its adhesion characteristic, and is done in accordance with the parameter specifications for conventional printing preparation provided by the manufacturer. After this treatment, the film is imprinted using a lacquer-laminate mixture and intaglio printing. The lacquer-laminate mixture consists of water in which 40% by solid-body content of styrene acrylate is dispersed. After the volatile components have evaporated and the lacquer has hardened, a recess of the imprinted areas results whereby the depth dimension of the recess may be varied by varying the quantity of lacquer-laminate mixture applied.

EXAMPLE 5

A plastic film about 20 μm thick consisting of a polypropylene is corona-treated to increase its adhesion characteristic. After this treatment, the film is imprinted using a lacquer-laminate mixture and intaglio printing. The lacquer-laminate mixture consists of ethanol in which 40% by weight of acidic acrylate copolymerisate and 6.5% by weight of nitrocellulose is dissolved. After the volatile components have evaporated, the resin layer contracts. Recesses in the imprinted surfaces, and thus a textured effect, are formed.

EXAMPLE 6

After corona treatment with a binary PVC-based intaglio ink, a plastic film about 30 μm thick consisting of a rear-side siliconized polyethylene is completely printed onto the side opposing the siliconized layer using frontal printing. Subsequently, the same side is imprinted with a lacquer-laminate mixture. The lacquer-laminate mixture consists of ethanol in which 25% by weight of fumaric resin, 6.5% by weight of nitrocellulose, and 15% by weight of pearl pigments is dissolved or dispersed. After the volatile components have evaporated, the fumaric resin layer contracts. Recesses in the imprinted surfaces underlaid with pearl gloss, and thus a textured effect, are formed.

The iprinted effects achieved with the procedure are primarily esthetic, and are therefore used during the manufacture of packaging films and laminated films. Such films are particularly used to package food and hygienic products. But book and periodical covers could also be laminated using such films. It is also possible to provide films with safety effects, such as with markings visible only when viewed obliquely. Tangible structures such as Braille type could be created using this procedure.

There has thus been shown and described a novel method for producing a textured effect in a plastic film, and plastic films having a relief pattern made by this method which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for producing an imprinted effect in a plastic film, comprising the following manufacturing steps:

a) applying to a localized surface area of the plastic film that is to receive the impression effect, a mixture of lacquer and solvent in liquid form which is hardenable with volumetric shrinkage, wherein the plastic film surface is made substantially insoluble by the solvent;

b) drying the lacquer-solvent mixture; and c) allowing the lacquer to harden and shrink and form a lacquer-laminate layer that is completely bound to the localized surface area with a simultaneous tightening of the laminated plastic film below the lacquer-laminate layer without the formation of wrinkles.

2. Method as in claim 1, wherein the plastic film to be provided with the imprinted effect is selected from the group consisting of a polyolefin, a polyamide, a thermoplastic elastomer, a polyvinyl chloride mixed with softener, PET and a soft, elastic mixture and co-polymer.

3. Method as in claim 1, wherein the plastic film to be provided with the imprinted effect is metallized on at least one side, and wherein the imprinted effect is created either on at least one of the a metallized or a non-metallized side of the film.

4. Method as in claim 1, wherein solvent for the lacquer-solvent mixture is selected from the group consisting of alcohols, water, esters, and mixtures thereof and wherein said lacquer-solvent mixture does not substantially dissolve the plastic surface to be imprinted.

5. Method as in claim 1, wherein the lacquer comprises at least 25% by weight of a soluble and transparent hardening resin that hardens with volumetric shrinkage.

6. Method as in claim 1, wherein the lacquer is subjected to physically induced lattice-like polymerization and shrinking.

7. Method as in claim 1, wherein the lacquer is colored by means of a dye dissolved or dispersed in the solvent.

8. Method as in claim 1, wherein a convex, embossed relief is created in the plastic film by applying a counter-impression of the lacquer-solvent mixture on a surface of the plastic-film opposite a face surface.

9. Textured plastic film produced by the method as recited in claim 1.

10. Method as in claim 6, wherein the lacquer is subjected to UV irradiation.

11. Method as in claim 6, wherein the lacquer is subjected to a heat treatment.

12. Method as in claim 1, further comprising the step of treating the surface of the plastic film, prior to applying said mixture of lacquer and solvent to said localized surface area thereof, to increase the wettability and paint bonding ability of said surface area.

13. Method as in claim 12, wherein the surface treatment is achieved using at least one of an etching, electrical corona, plasma, chemicals, or a flaming procedure.

* * * * *